(12) United States Patent
Fiaschi et al.

(10) Patent No.: US 11,190,437 B2
(45) Date of Patent: Nov. 30, 2021

(54) METHODS, APPARATUS AND COMPUTER PROGRAMS FOR ALLOCATING TRAFFIC IN A TELECOMMUNICATIONS NETWORK

(71) Applicant: Telefonaktiebolaget LM Ericsson (publ), Stockholm (SE)

(72) Inventors: Giovanni Fiaschi, Sollentuna (SE); Mats Forsman, Rönninge (SE); Ahmad Rostami, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/771,851

(22) PCT Filed: Dec. 21, 2017

(86) PCT No.: PCT/EP2017/084207
§ 371 (c)(1),
(2) Date: Jun. 11, 2020

(87) PCT Pub. No.: WO2019/120551
PCT Pub. Date: Jun. 27, 2019

(65) Prior Publication Data
US 2020/0396154 A1 Dec. 17, 2020

(51) Int. Cl.
*H04L 12/729* (2013.01)
*H04L 12/717* (2013.01)
(Continued)

(52) U.S. Cl.
CPC ............ *H04L 45/125* (2013.01); *H04L 45/02* (2013.01); *H04L 45/42* (2013.01); *H04L 45/64* (2013.01);
(Continued)

(58) Field of Classification Search
CPC ....... H04L 45/125; H04L 45/02; H04L 45/42; H04L 45/64; H04L 43/0882; H04L 41/147; H04L 47/125; H04L 45/124
See application file for complete search history.

(56) References Cited

U.S. PATENT DOCUMENTS 6,538,777 B1 * 3/2003 Barry .................. H04J 14/0227
370/370
7,346,056 B2 3/2008 Devi
(Continued)

OTHER PUBLICATIONS

Villamizar, C., "OSPF Optimized Multipath (OSPF—OMP)", Internet Engineering Task Force, Feb. 24, 1999, pp. 1-38, draft-ietf-ospf-omp-02, IETF.
(Continued)

*Primary Examiner* — Mohamed A Kamara
(74) *Attorney, Agent, or Firm* — Coats + Bennett, PLLC (57) ABSTRACT

Embodiments of the disclosure provide methods, apparatus and computer programs for allocating traffic in a telecommunications network comprising a plurality of nodes, with pairs of nodes being connected by respective links. A method comprises obtaining a plurality of demands for connectivity between respective first nodes and respective second nodes of the telecommunications network, each demand being subject to a respective constraint associated with the connectivity between the respective first node and the respective second node; for each demand, generating a list of possible paths between the first node and the second node satisfying the constraint; based on the list of possible paths for each demand and an indication of traffic usage for each demand, determining, for each demand, weights in respect of each of the possible paths; and providing the weights to nodes of the telecommunications network, for the distribution of traffic associated with each of the plurality of demands to the possible paths in accordance with the respective weights.

21 Claims, 5 Drawing Sheets

(51) Int. Cl.
    *H04L 12/24*     (2006.01)
    *H04L 12/751*    (2013.01)
    *H04L 12/715*    (2013.01)
    *H04L 12/26*     (2006.01)

(52) U.S. Cl.
    CPC ........ *H04L 41/147* (2013.01); *H04L 43/0882* (2013.01)

(56) References Cited

U.S. PATENT DOCUMENTS

| | | | |
|---|---|---|---|
| 8,218,445 B2* | 7/2012 | Katz | H04L 45/12 370/238 |
| 2004/0042473 A1* | 3/2004 | Park | H04L 45/128 370/408 |
| 2012/0087377 A1* | 4/2012 | Lai | H04L 45/04 370/427 |

OTHER PUBLICATIONS

Huerfano, D. et al., "Joint Optimization of Path Selection and Link Scheduling for Millimeter Wave Transport Networks", 1CC2017: WS07—Workshop on Flexible Networks (FlexNets), May 21, 2017, pp. 1-6, IEEE.

* cited by examiner

METHODS, APPARATUS AND COMPUTER PROGRAMS FOR ALLOCATING TRAFFIC IN A TELECOMMUNICATIONS NETWORK

TECHNICAL FIELD

Embodiments of the present disclosure relate to telecommunication networks, and particularly relate to methods, apparatus and computer program products for allocating traffic among possible paths through a telecommunications network.

BACKGROUND

The problem of traffic routing in a network has been the subject of research for many years, and involves selecting a path for traffic in a network. Routing is performed for many types of networks, including circuit-switched networks and packet-switched networks. Conventional approaches to routing generally involve the assessment of multiple possible paths between two nodes of the network (e.g. an ingress or source node and an egress or destination node), and the selection of one particular path for the traffic based on some metric or cost criteria. For example, the shortest path may be selected, or the path leading to minimal cost.

However, this approach may not always lead to the optimal solution for the traffic, or for the network as a whole. For example, a demand for connectivity may specify one or more constraints to be satisfied by the network (e.g., a maximum latency). If a particular path satisfies the constraints, it may be beneficial for the network to allocate traffic to the particular path even if the path is not otherwise "optimal" in the sense of being shortest, minimal cost etc.

Unequal Cost Multipath traffic distribution taking into account traffic load on distant parts of the network was previously defined in IETF drafts (see, "draft-ietf-ospf-omp-02: OSPF Optimized Multipath (OSPF-OMP)"). By distributing information about the network load with link-state routing protocols (e.g., Open Shortest Path First (OSPF), intermediate system to intermediate system (IS-IS)), the routing algorithms can calculate multiple paths and distribute the traffic in such a way to avoid overload on specific links.

However, this work was intended for application to large networks, and is therefore based on dynamic adaptation; paths for each connectivity demand are dynamically determined in dependence on the changing load conditions in the network. Thus the global routing of traffic through the network may not be optimal at any given time.

SUMMARY

It is an object of embodiments of the disclosure to overcome these and other problems in the art.

One aspect of the disclosure provides a method for allocating traffic in a telecommunications network, the telecommunications network comprising a plurality of nodes, with pairs of nodes being connected by respective links. The method comprises: obtaining a plurality of demands for connectivity between respective first nodes and respective second nodes of the telecommunications network, each demand being subject to a respective constraint associated with the connectivity between the respective first node and the respective second node; for each demand, generating a list of possible paths between the first node and the second node satisfying the constraint; based on the list of possible paths for each demand and an indication of traffic usage for each demand, determining, for each demand, weights in respect of each of the possible paths; and providing the weights to nodes of the telecommunications network, for the distribution of traffic associated with each of the plurality of demands to the possible paths in accordance with the respective weights.

Another aspect provides a network management node, for allocating traffic in a telecommunications network, the telecommunications network comprising a plurality of nodes, with pairs of nodes being connected by respective links. The network management node comprises processing circuitry and a non-transitory machine-readable medium storing instructions which, when executed by processing circuitry, cause the network management node to: obtain a plurality of demands for connectivity between respective first nodes and respective second nodes of the telecommunications network, each demand being subject to a respective constraint associated with the connectivity between the respective first node and the respective second node; for each demand, generate a list of possible paths between the first node and the second node satisfying the constraint; based on the list of possible paths for each demand and an indication of traffic usage for each demand, determine, for each demand, weights in respect of each of the possible paths; and provide the weights to nodes of the telecommunications network, for the distribution of traffic associated with each of the plurality of demands to the possible paths in accordance with the respective weights.

A further aspect provides a computer program product comprising a non-transitory machine-readable medium storing instructions which, when executed by processing circuitry of a network management node, the network management node being coupled to a telecommunications network, the telecommunications network comprising a plurality of nodes, with pairs of nodes being connected by respective links, cause the network management node to: obtain a plurality of demands for connectivity between respective first nodes and respective second nodes of the telecommunications network, each demand being subject to a respective constraint associated with the connectivity between the respective first node and the respective second node; for each demand, generate a list of possible paths between the first node and the second node satisfying the constraint; based on the list of possible paths for each demand and an indication of traffic usage for each demand, determine, for each demand, weights in respect of each of the possible paths; and provide the weights to nodes of the telecommunications network, for the distribution of traffic associated with each of the plurality of demands to the possible paths in accordance with the respective weights.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
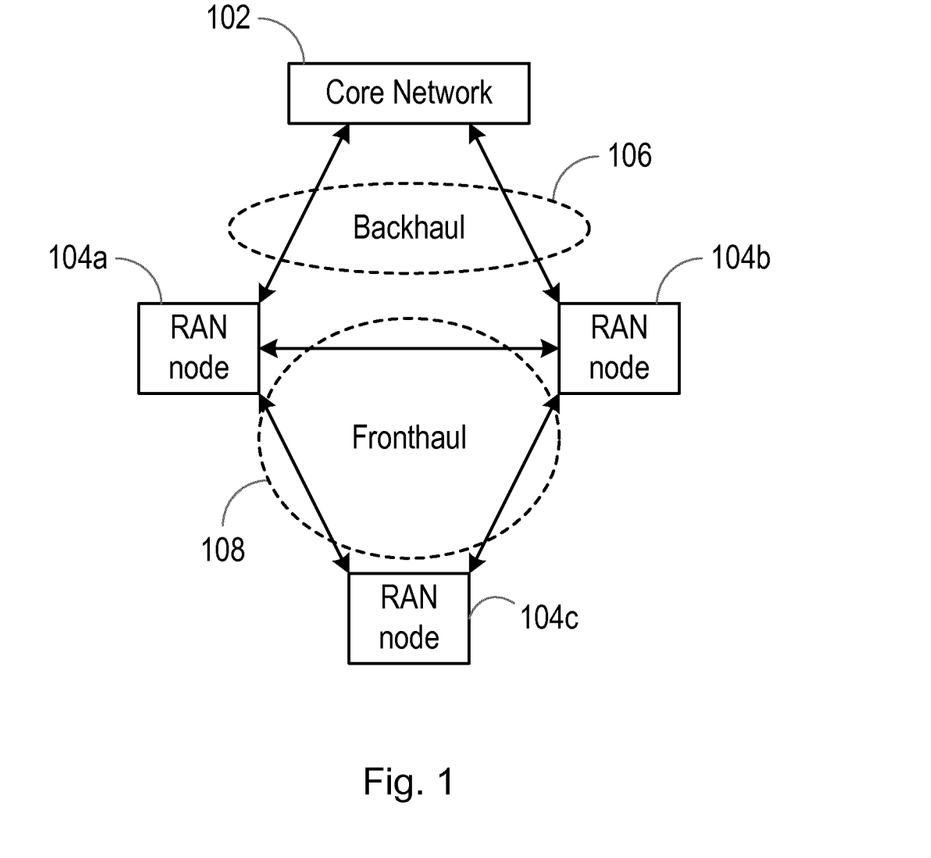
FIG. 1 is a schematic diagram of a telecommunications network.

FIG. 1 shows a telecommunications network 100 in which embodiments of the disclosure may be implemented according to one example.

The network 100 may implement any suitable standard for the provision of radio communications. For example, the network 100 may implement a cellular telecommunications standard, such as those which have been developed, or are being developed, or will be developed, by the 3$^{rd}$ Generation Partnership Project (3GPP). Such standards include Global System for Mobile Communications (GSM) including General Packet Radio Service (GPRS) and Enhanced Data Rates for GSM Evolution (EDGE), Universal Mobile Telecommunications Systems (UMTS) including High Speed Packet Access (HSPA), Long Term Evolution (LTE) including LTE Advanced and LTE Advanced Pro, and the fifth generation (5G) standard currently under development, New Radio (NR).

The network 100 comprises a core network 102 and a radio access network (RAN) comprising a plurality of RAN nodes 104a, 104b, 104c (collectively 104). One or more of the RAN nodes 104 are connected to the core network 102 via a backhaul network 106. The RAN nodes 104 are connected to each other via a fronthaul network 108.

The RAN nodes 104 may comprise base stations, nodeBs, eNodeBs or gNodeBs (the latter being the nomenclature currently used in the developing 5G standard). It will further be appreciated by those skilled in the art that the functions of RAN nodes may be distributed across multiple entities and/or multiple sites. Not all of those entities may have connectivity to the core network 102. For example, the functions of a RAN node may be distributed between a central unit (CU) and one or more distributed units (DUs).

The fronthaul network 108 thus provides connectivity between nodes 104 of the radio access network. Such connectivity may be required in multiple scenarios. For example, while in a dual connectivity mode, a user equipment (UE) may have multiple connections to RAN nodes 104 active at the same time (e.g. multiple DUs and/or multiple base stations). Close co-ordination may be required between the RAN nodes 104 to prevent collision of transmissions to the UE, duplication of transmissions, etc. In other examples, the functions of RAN nodes may be distributed or split across multiple entities or sites, with the fronthaul network 108 providing connectivity between those distributed entities and/or sites.

The nature of traffic allocated to the fronthaul network 108 may therefore have the following characteristics:

It requires very strict latency constraints (e.g., tens of microseconds);
Traffic from different users is prone to collision; and
The amount of traffic cannot be measured for improvement by route adjustment, as the network reaction would be too late.

The first of these characteristics restricts the number of paths which satisfy the latency constraint. If a path through the fronthaul network 108 does not satisfy the latency constraint, it cannot be considered as an option for providing the requested connectivity. This may simplify the complexity of the route calculation problem.

The second of these characteristics may make it advantageous for traffic to be distributed across multiple paths, rather than allocated to a single "best" path. In the latter case, collision between traffic may result in significant degradation to the network performance, as the entire traffic for a particular demand is affected by the collision. If the traffic is distributed over multiple paths, a collision on any one of those paths is less likely and network performance is improved.

The third of these characteristics means that long-term utilization trends may be used to determine and optimize traffic allocation, rather than dynamic approaches which seek to optimize the performance of individual traffic paths.

Figure 2:
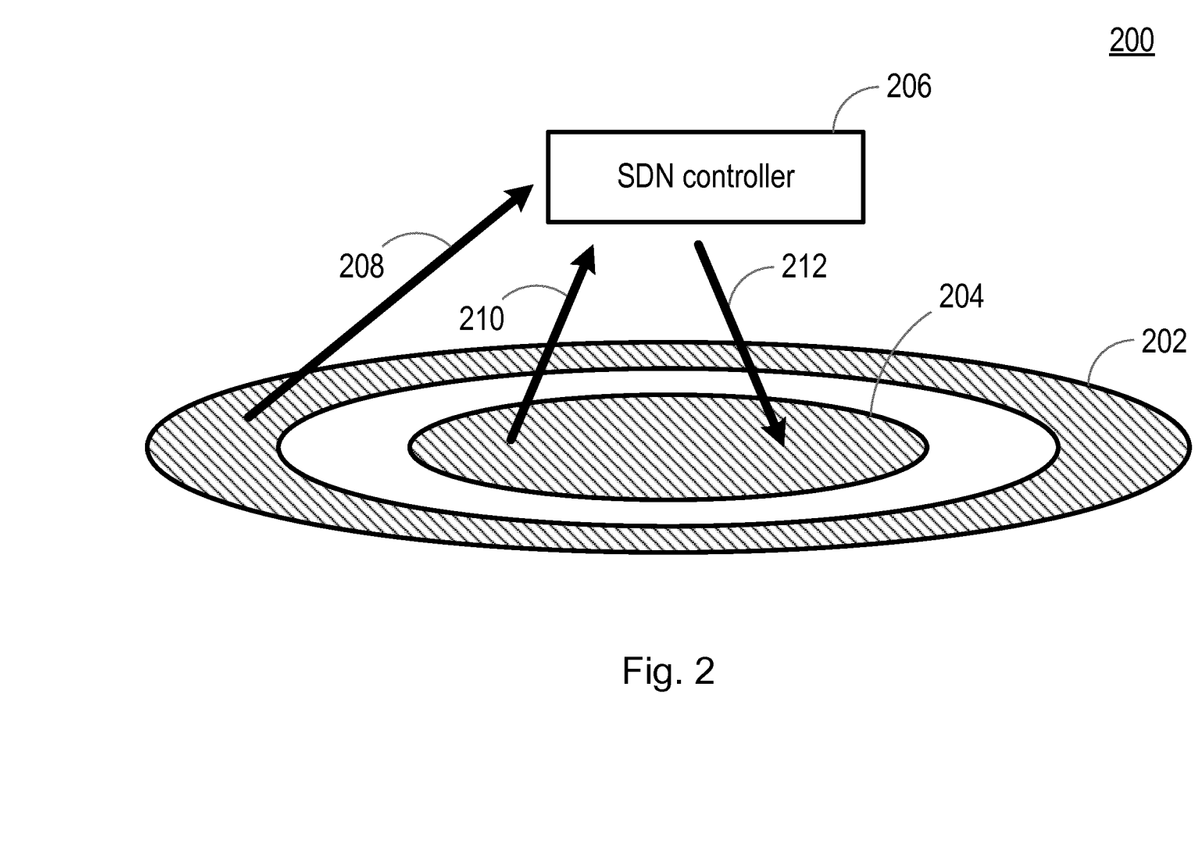
FIG. 2 is a schematic diagram of a traffic allocation system according to embodiments of the disclosure.

FIG. 2 is a schematic diagram of a traffic allocation system 200 according to embodiments of the disclosure. The system 200 comprises a client network 202 and a transport network 204 providing connectivity for the client network 202. In one particular embodiment, the client network 202 may comprise a radio access network such as that described above with respect to FIG. 1, while the transport network 204 may comprise the fronthaul network 108. However, in other embodiments, the embodiments of the disclosure may allocate traffic for any telecommunications network.

The transport network 204 comprises a plurality of nodes coupled to each other via respective links. A node may be connected to any number of other nodes of the network 204. In one example, the transport network 204 may utilize optical communication techniques, with the nodes comprising optical switches or other hardware and the links comprising optical links such as optical fibres.

A management node 206 for the system 200 is communicatively coupled to both the client network 202 and the transport network 204. The management node 206 may be a software defined networking (SDN) controller or SDN function, for example. The management node 206 is operative to receive connectivity demands from the client network 202, and allocate traffic for those connectivity demands to one or more paths through the transport network 204. Further detail is provided below.

In step 210, the management node 206 obtains topology information for the transport network 204. For example, the topology information may comprise one or more of: identities of a plurality of nodes in the network; an indication of the links between respective pairs of the plurality of nodes (e.g., an indication as to which node identities are connected to which other node identities); an indication of the penalty associated with each link and/or node (e.g. latency); and an indication of the capacity of each link and/or node. The topology information may be visualized as a graph of nodes interconnected by links.

In step 208, the management node 206 obtains, from the client network 202, a plurality of demands for connectivity between nodes of the client network 202 or between attachment points of the transport network. Thus each connectivity demand may comprise identities of a first node (e.g. a source or ingress node) and a second node (e.g., a destination or egress node), with traffic to be routed between those nodes via the transport network 204.

Each connectivity demand may further specify one or more constraints to be satisfied by the routing through the transport network 204. For example, the connectivity demand may specify a maximum latency to be associated with the routing. In this case, the constraint is satisfied by a particular path through the network 204 if the total latency of the path is less than the maximum latency. In examples where the transport network 204 comprises a fronthaul network (such as the network 108 described above with respect to FIG. 1), the maximum latency may be relatively short, e.g., tens of microseconds. In this context, the constraint may be specified by the user or client associated with the connectivity demand. In other embodiments, each connectivity demand may alternatively or additionally be associated with a constraint which is specified by an operator of the transport network 204.

For example, although optical fibres provide an excellent transmission medium with high bandwidth, optical signals will generally deteriorate as they cross optical links (e.g. fibres) and nodes (e.g. switches) owing to various effects such as group velocity dispersion, fibre loss, adjacent channel cross-talk, self phase modulation, etc. Eventually the optical signals may degrade to the point where they are unreadable. Where the transport network 204 comprises optical links and optical nodes, therefore, it may be beneficial to limit the light path length and convert the optical signals to electrical signals at certain points (before onward transmission as optical signals). A constraint may be associated with each connectivity demand defining a maximum light path length through the network before optical-to-electrical conversion.

Conversely, optical-to-electrical conversion is associated with increased cost in operating the transport network 204 (e.g. through the necessity of providing electro-optic converters, etc) and reduced capacity in the transport network (as the electro-optic converters may become bottlenecks for traffic passing through the network). A constraint may therefore be associated with each connectivity demand limiting the number of electro-optic converters in each path. For example, the constraint may define a maximum number of electro-optic converters per unit length within the path.

Further examples of possible constraints comprise a maximum number of crossed nodes within the path (e.g., to limit node resource usage or to limit the path length for path computation purposes), and a maximum number of segments used to express the path routing (e.g. after label stack optimization in a Segment Routing network). The latter constraint may be applicable particularly if the nodes or routers in the path have a limitation as to the label stack depth they are capable of processing.

Each connectivity demand may further be associated with or comprise an indication of the traffic usage for that connectivity demand (e.g., an amount of traffic which is to use the connectivity). For example, the traffic usage may be predicted by the user or client demanding connectivity based on an expected demand for the connectivity. Alternatively, the traffic usage may be measured by the client or the management node 204 where paths for the connectivity demand have already been established for a period of time (e.g. when the process described herein is used to update existing traffic allocations). In the latter case, the traffic usage may be an average of the traffic usage measured over a particular time window, for example.

In step 212, the management node computes one or more paths satisfying the constraints for each connectivity demand, and determines weights according to which traffic for each connectivity demand should be allocated to each of the computed paths. These paths and their respective weights are provided to the transport network 204, and particularly to the first nodes (e.g., the source or ingress nodes), so that traffic for each demand can be allocated between one or more paths in accordance with the weights. Further detail regarding this and other aspects of the disclosure is provided below with respect to FIG. 3.

Figure 3:
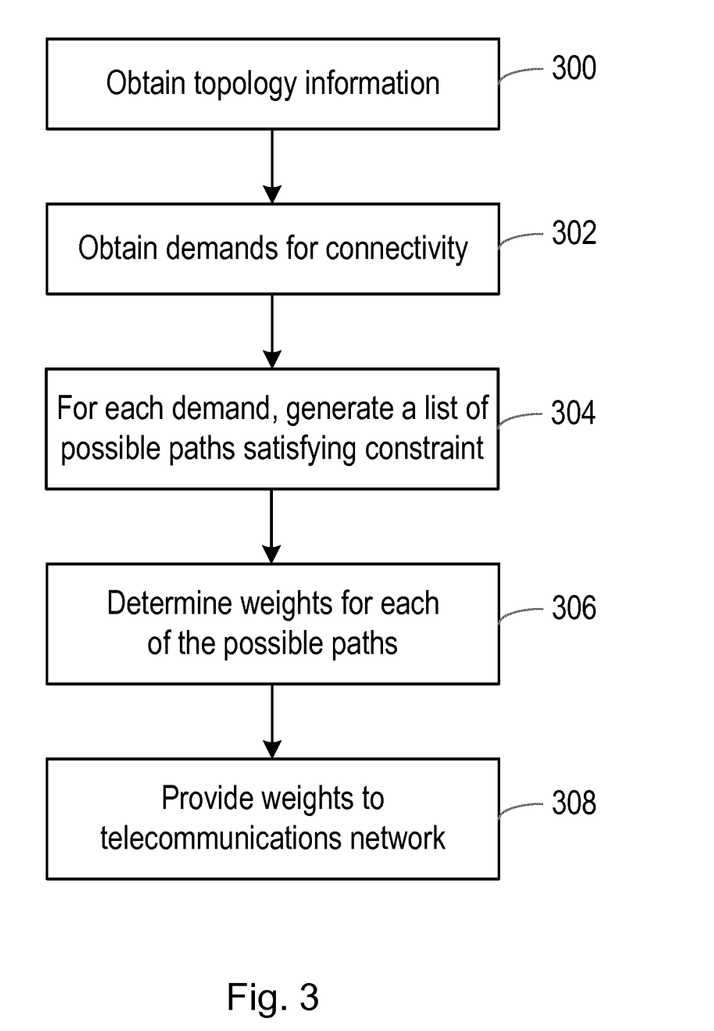
FIG. 3 is a flowchart of a method according to embodiments of the disclosure.

FIG. 3 is a flowchart of a method according to embodiments of the disclosure. The method may be performed in a management node for a telecommunications network, such as the SDN controller 206 described above with respect to FIG. 2.

In step 300, the management node obtains topology information for telecommunications network. This step may be largely similar to step 210 described above. Thus, in one embodiment, the topology information may comprise one or more of: identities of a plurality of nodes in the network; an indication of the links between respective pairs of the plurality of nodes (e.g., an indication as to which node identities are connected to which other node identities); an indication of the penalty associated with each link and/or node (e.g. latency, etc); and an indication of the capacity of each link and/or node. The management node may obtain such information through communications with the network itself (e.g. via one or more control interfaces between the management node and the network), or through receipt of configuration information from a designer or operator of the network. The topology information may be updated periodically or whenever a change is made to the network topology.

In the following the nodes are indicated with indices. A link connecting node i with node j is indicated with $l_{ij}$.

A link $l_{ij}$ has capacity $C(l_{ij})$, which can be expressed e.g. as its bandwidth in bits per second.

A link $l_{ij}$ has penalty penalty($l_{ij}$), which can be expressed in different units of measure (e.g., seconds or submultiples for time penalties, e.g., delay or latency).

A node i may also have a penalty penalty(i) in the same unity of measure as the link penalty. For example, packets crossing routers may experience some latency.

In this example, the penalty is assumed to be additive, that is to say, the resulting penalty of crossing one or more links and one or more nodes is the sum of their individual penalties. For example, penalties such as latency may be additive. Those skilled in the art will appreciate that different penalties may accumulate in different and/or non-linear ways. For example, optical impairments may accumulate in a non-linear fashion. The present disclosure is not limited in that respect.

In step 302, the management node obtains a plurality of demands for connectivity over the network. This step may be largely similar to step 208 described above. Thus the plurality of demands for connectivity may relate to connectivity between nodes of a client network or between attachment points of a transport network. Each connectivity demand may comprise or be associated with identities of a first node (e.g. a source or ingress node) and a second node (e.g., a destination or egress node), with traffic to be routed between those nodes via the transport network 204. Each connectivity demand may further be associated with one or more constraints to be satisfied by the routing through the telecommunication network (e.g., one or more of the constraints described above), and an indication of traffic usage of the connectivity.

The connectivity demand between nodes i and j is indicated with $d_{ij}$. The connectivity demand $d_{ij}$ may be associated with a measured or an expected usage $u(d_{ij})$. The connectivity demand $d_{ij}$ may further be associated with a maximum acceptable penalty max_penalty($d_{ij}$) (i.e., a constraint). A path may not be selected for the demand if it exceeds that maximum acceptable penalty.

Connectivity usages need to be comparable among each other (e.g., use the same or similar units), and similarly link capacities need to be comparable among each other. However, it will be understood by those skilled in the art that connectivity usage and link capacity may not need to be directly comparable with each other, i.e. defined using the same or similar units.

The information relative to a connectivity demand may be sent by a client network to the management node, e.g., as in step 208 described above.

In step 304, the management node generates, for each connectivity demand, a list of possible paths through the telecommunications network from the first node to the second node which satisfy the constraint or constraints (e.g. a maximum latency). In one embodiment, the management node calculates all non-looping paths which satisfy the constraint or constraints.

In this context, a path $p_k(d_{ij})$ for demand $d_{ij}$ is defined as the set of adjacent nodes and links it crosses. The penalty of a path is the sum of the penalties of all nodes and links it crosses. $P(d_{ij})$ is the set of paths satisfying the requirements for $d_{ij}$.

There are several possibilities to compute the paths satisfying a certain connectivity demand (the $P(d_{ij})$ set above). Two examples include breadth-first search (BFS) and depth-first search (DFS) algorithms. In the former case, the searching algorithm starts at a tree root (e.g., the first node) and explores neighbor nodes first, before moving to the next level neighbours. In the latter case, the algorithm again starts at a tree root, but explores as far as possible along each branch before backtracking. The following pseudo-code defines a breadth-first adaptation according to one embodiment:

```
01   function all_feasible_paths (network N, demand d from A to Z):
02      return solution_list
03
04      init empty solution_list
05      init empty queue Q
06      Q.enqueue(path(A)) //degenerate path with only node A
07
08      while Q is not empty
09         current_path = Q.dequeue
10         for each out_link from last_node(current_path) in N
11            if latency(current_path) + latency(out_link) >
12               max_latency(d):
13                  break//prune out_link
14            if last_node(out_link) is in current_path:
15               break //prune out_link, loop
16            if last_node(out_link) == Z:
17               add current_path + out_link to solution_list
18            Q.enqueue(current_path + out_link)
```

In line 11, the latency is assumed to include the end nodes of all the paths. In line 17 and 18, the "+" operator indicates adding a link element and its terminating node to a path which is a set. The "if" statement at line 11 may prune many alternatives and keep the problem space and the complexity relatively low.

Thus the output of step 304 is a set of one or more paths for each connectivity demand, which satisfy the constraint(s) associated with that demand.

In step 306, the management node determines weights for each of the possible paths in each set, based on the indication of traffic usage for each demand. The determination of weights may be global, in the sense that the weights for a set of possible paths for a first connectivity demand may depend on the weights for a set of possible paths for a second connectivity demand (and may depend on the weights determined for the sets of paths for all other connectivity demands in the network). In one embodiment, the management node may perform an optimization algorithm to determine the weights for all possible paths for all connectivity demands.

Given all the paths $p_k$ satisfying all the connectivity demands $d_{ij}$ in the network, a weight $w_k$ is defined for each path $p_k$, where $0 \leq w_k \leq 1$. If more than one path satisfies a connectivity demand, the traffic for that demand may be distributed on the paths according to the weights.

It was stated above that a connectivity demand $d_{ij}$ has an expected usage $u(d_{ij})$. As a consequence, a path $p_k$ satisfying demand $d_{ij}$ has expected usage $u(p_k) = w_k \cdot u(d_{ij})$.

The usage of a link $l_{ij}$ between two nodes i and j can be defined as the sum of the usages of all paths crossing it, $u(l_{ij}) = \Sigma_{l_{ij} \in p_k} u(p_k)$.

Two possible optimization algorithms are proposed below: a minimax linear programming algorithm and a quadratic optimization algorithm.

The minimax linear programming problem can be formulated as follows:
Input
   $c(l_{ij})$, capacity of the transport network links
   $u(d_{ij})$, usage estimation of the connectivity demands
Variables
   $w_i$, weight of path $p_i$
   v, bottleneck to minimize (artificial variable)
Constraints $$\sum_{p_k \in P(d_{ij})} w_k = 1, \forall d_{ij}$$

(dummy variable minimization constraints)

$$v \geq u(l_{ij})/c(l_{ij}), \forall l_{ij}$$

(link load variable definitions)

$$w_i \geq 0, \forall w_i$$

(positive weights)
Objective Function $$\min v$$

In this context, v is the highest usage over a single link in the entire network. Thus, by minimizing v, congestion in the network as a whole can be reduced.

It will be noted that the formulation above comprises no constraint that $u_{ij}(l_{ij})/c_{ij}(l_{ij}) \leq 1$. That is, there is no constraint that the usage over a particular link should not exceed the capacity of that link. The reasons for this are two-fold. First, it was mentioned above that the usage and capacity need not be directly comparable to each other. In such cases, a usage which matches the capacity of a link may not lead to a ratio which is equal to one. However, even when the usage and capacity are directly comparable to each other, the formulation may not require a constraint of this type. By seeking to minimize v, the optimization algorithm can be expected to produce weights which seek to reduce the presence of bottlenecks in the system. However, it may be the case that the network topology and the connectivity demands placed on the network do not permit of a solution in which bottlenecks are avoided altogether (i.e., in which $u_{ij}(l_{ij})/c_{ij}(l_{ij}) \leq 1$ for all links in the network).

The minimax linear programming method may thus seek to achieve a solution in which bottlenecks are avoided or minimized to the extent possible. However, the method may also lead to solutions in which overall network traffic is not minimized. That is, the aggregate total of traffic over all links in the network may be higher than other solutions.

In an alternative embodiment, the optimization algorithm comprises a quadratic optimization algorithm. This may be formulated as follows in one embodiment:

Input
   $c(l_{ij})$, capacity of the transport network links
   $u(d_{ij})$, usage estimation of the connectivity demands
Variables
   $w_i$, weight of path $p_i$
   $y_{ij}$, load on link $l_{ij}$
Constraints $$\sum_{p_k \in P(d_{ij})} w_k = 1, \forall d_{ij}$$

(normalization constraints)

$y_{ij} = u(l_{ij})/c(l_{ij}), \forall l_{ij}$ (link load variable definitions)

$w_i \geq 0, \forall w_i$ (positive weights)
Objective Function min $\Sigma y_{ij}^2$, sum on all links According to this formulation, the objective function is to obtain a set of weights in which the sum of the square of the ratio of usage to capacity over a single link ($y_{ij}$), over all the links of the network, is minimized. In this way, the quadratic optimization algorithm seeks to reduce the traffic over the network as a whole, while also seeking to reduce the presence of bottlenecks in the network. That is, the sum over the network has the effect of taking into account the overall network traffic, while the presence of significant bottlenecks (i.e. in which $y_{ij}$ is large) will increase the function and should also therefore be reduced.

In step 308, the management node provides the determined weights and their respective paths to the telecommunications network to be implemented. For example, the determined weights and paths may be provided to the respective first nodes (e.g. the source or ingress nodes) for each demand, to enable those first nodes to allocate traffic associated with the demand to the different possible paths in accordance with the weights. In one embodiment, the first nodes may allocate traffic to the different paths in proportion to the weights.

Those skilled in the art will appreciate that multi-factorial optimization processes of the sort described above are computationally complex. However, in this case the problem is simplified by first determining only those paths which satisfy the constraint(s) for each demand. This may significantly reduce the complexity of the problem, particularly when relatively few paths through the network satisfy the constraint(s).

The method may be performed at any time during network configuration (i.e. at or near start-up of the network), or during network operation. The method may be performed repeatedly during network operation, to ensure continued optimized network performance. If repeated, the method may utilize measured traffic usage to determine the weights rather than predicted traffic usage In one embodiment, the calculated paths for each demand can be set up or established in the network by the management node once they have been calculated, e.g. in step 304. Changes to the configuration of the paths and their weights may be determined upon changes to the network topology (e.g. upon a link failure, or addition of new links), and/or upon changes to the traffic loading. However, topology changes may be less frequent than changes to the traffic loading. Therefore, if the method is repeated, it is less likely that the set of possible paths for a particular demand will have changed since an initial iteration of the method such that numerous new paths for a demand satisfy the constraint(s) associated with that demand; similarly, it is less likely that the topology will change such that numerous paths which previously satisfied the constraint(s) no longer satisfy the constraint(s). Thus, it may be relatively straightforward for the weights to be changed in repetitions of the method, without requiring significant changes to the network to establish new paths or remove old paths.

Figure 4:
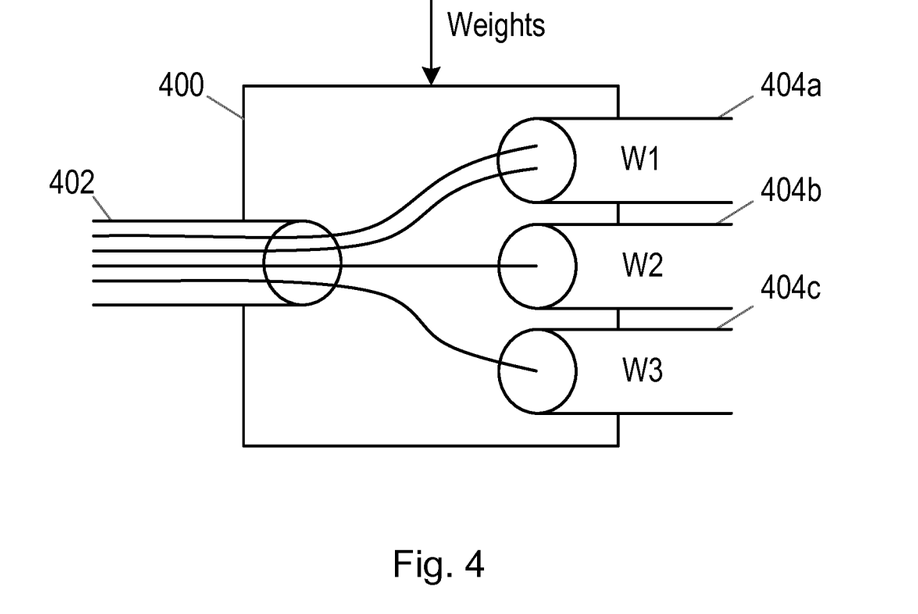
FIG. 4 is a schematic diagram showing distribution of traffic according to embodiments of the disclosure.

FIG. 4 is a schematic diagram showing distribution of traffic in a network node 400 according to embodiments of the disclosure. The network node 400 may be any suitable node providing routing of traffic over one or more links to one or more other network nodes in a telecommunications network. For example, the network node 400 may comprise a switch. In one embodiment, the network comprises an optical network, with the links comprising optical links such as optical fibres.

As noted above, the network node 400 receives weights from the management node calculated, for example, in accordance with the methods described above with respect to FIGS. 2 and 3. The network node 400 also comprises an input traffic link 402 and one or more output traffic links 404a, 404b, 404c (collectively, 404). The input traffic link 402 may comprise an interface with a demanding party of client (e.g. in a client network). The output traffic links 404 may comprise links to one or more other nodes in the network (e.g., in a transport network).

The demand for connectivity may comprise a plurality of data flows. The illustrated example shows a single demand comprising four data flows. However, each demand may comprise any number of data flows. Moreover, the node may in general receive or process traffic for multiple demands.

FIG. 4 further assumes that each of the output traffic links 404 defines a particular possible path for the traffic. The node may additionally have output links over which no path is possible for the demand.

Traffic is allocated to the different paths in accordance with the weights $w_1$, $w_2$ and $w_3$. In the illustrated example, two flows are allocated to link 404a, one flow is allocated to link 404b, and one flow is allocated to link 404c. In a scenario in which each of the flows comprises a similar amount of traffic, this implies the following weights:
   $w_1 = 0.5$
   $w_2 = 0.25$
   $w_3 = 0.25$ In allocating the flows to the different paths, the node 400 may determine the entire path for the traffic flow at the point of transmission over the respective output links 404. In this way, other intermediate nodes on the path need not perform any traffic allocation method or apply any weights; rather the intermediate nodes simply relay the traffic according to the path which is already determined for it (e.g. through information contained in the traffic header). Further, if two paths for a particular demand overlap partially (e.g. the paths are not identical but comprise one or more links in common with each other), the two paths may be treated independently of each other. The intermediate node at which the paths diverge from each other may not "split" the combined traffic for both paths, but rather treats each path (or rather the flows allocated to each path) separately.

Figure 5:
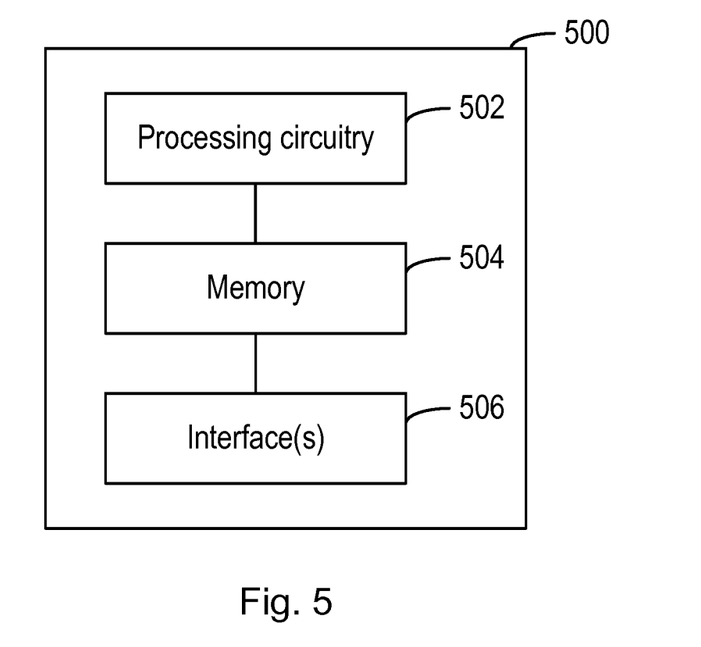
FIG. 5 is a schematic diagram of a network management node according to embodiments of the disclosure.

FIG. 5 is a schematic diagram of a network management node 500 according to embodiments of the disclosure. The network management node 500 may be operable as the management node 206 shown in FIG. 2, for example. The network management node 500 may be operable to perform the method according to FIG. 3.

The network management node 500 comprises processing circuitry 502 and a non-transitory machine-readable medium (such as memory) 504.

The machine-readable medium 504 stores instructions which, when executed by the processing circuitry 502, cause the network node 500 to: obtain a plurality of demands for connectivity between respective first nodes and respective second nodes of the telecommunications network, each demand being subject to a respective constraint associated with the connectivity between the respective first node and the respective second node; for each demand, generate a list of possible paths between the first node and the second node satisfying the constraint; based on the list of possible paths for each demand and an indication of traffic usage for each demand, determine, for each demand, weights in respect of each of the possible paths; and provide the weights to nodes of the telecommunications network, for the distribution of traffic associated with each of the plurality of demands to the possible paths in accordance with the respective weights.

The management network node 500 may further comprise one or more interfaces 506, providing interfaces for the transmission and/or reception of signals via any suitable modality. For example, the interfaces 506 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 502, machine-readable medium 504 and interfaces 506 may be coupled to each other in any suitable manner. For example, although FIG. 5 shows the components coupled together in series, it will be understood by those skilled in the art that the components may be coupled together in an alternative manner, such as via a bus.

The network management node 500 may alternatively be defined in terms of hardware and/or software modules configured to perform the steps of the methods described herein. For example, the network management node 500 may alternatively or additionally comprise: a first module configured to obtain a plurality of demands for connectivity between respective first nodes and respective second nodes of the telecommunications network, each demand being subject to a respective constraint associated with the connectivity between the respective first node and the respective second node; a second module configured to, for each demand, generate a list of possible paths between the first node and the second node satisfying the constraint; a third module, configured to, based on the list of possible paths for each demand and an indication of traffic usage for each demand, determine, for each demand, weights in respect of each of the possible paths; and a fourth module configured to provide the weights to nodes of the telecommunications network, for the distribution of traffic associated with each of the plurality of demands to the possible paths in accordance with the respective weights.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. In one embodiment, the modules are defined purely in hardware. In another embodiment, the modules are defined purely by software. A module may itself comprise other modules or functional units.

This software code may be stored in the device as firmware on some non-volatile memory e.g. EEPROM (to preserve program data when the battery becomes discharged or is removed for replacement).

Figure 6:
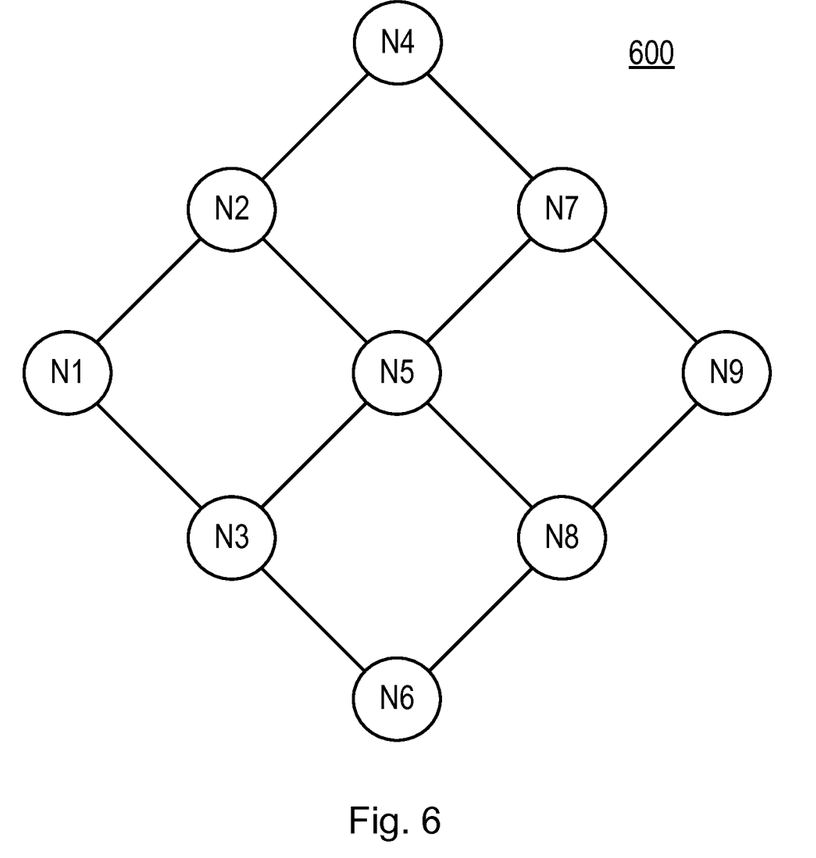
FIG. 6 is an example of a telecommunications network according to embodiments of the disclosure.

FIG. 6 shows in graph form a network 600 comprising nodes N1 to N9, used as an example to compare three different methods: shortest path; minimax linear programming; and quadratic optimization. The latter two methods are described above. The first method involves the selection of the shortest path between a first node (source or ingress node) and a second node (destination or egress node), and is a conventional method of allocating traffic in a telecommunications network. A 9.7 microsecond latency is associated with each of the links. Each of the links is assumed to have the same capacity.

It will be understood that any number of demands (two or more) may be allocated to the network according to embodiments of the disclosure. In this example, three demands are to be allocated to the network as follows:

| Demand | From | To | Usage | Max latency |
|---|---|---|---|---|
| 1 | N1 | N7 | 100 | 65 |
| 2 | N2 | N9 | 200 | 65 |
| 3 | N2 | N7 | 200 | 65 |

The latency constraints for each demand allow for 8 different paths for each demand.

In the shortest path algorithm, traffic for each demand is allocated to a single, shortest path between the first and second nodes. Thus, the entire traffic for demand 1 is allocated to the path N1-N2-N4-N7. The entire traffic for demand 2 is allocated to the path N2-N4-N7-N9. The entire traffic for demand 3 is allocated to the path N2-N4-N7. The links between these nodes are therefore clearly overloaded, while other links are totally unused. The mean load across the network is 108.33, while the variance (which indicates imbalance over the network) is 37196.97. The highest load is on links N2-N4 and N4-N7, which each have 500 units of traffic.

In the minimax linear programming algorithm embodiment, traffic for each demand is allocated to one or more paths between the first and second nodes based on weights for each path. Where a weight for a path is not mentioned below, it may be assumed that the weight is 0. Following the method above, the traffic for demand 1 is allocated with a 0.5 weight for the path N1-N2-N4-N7, and a 0.5 weight for the path N1-N3-N5-N7. The traffic for demand 2 is allocated with a 0.25 weight for the path N2 N1 N3 N6 N8 N9; a 0.25 weight for the path N2-N4-N7-N9; a 0.25 weight for the path N2-N5-N3-N6-N8-N9; and a 0.25 weight for the path N2-N5-N7-N9. The traffic for demand 3 is allocated with a 0.33 weight for the path N2-N1-N3-N5-N7; a 0.33 weight for the path N2-N4-N7; and a 0.33 weight for the path N2-N5-N8-N9-N7. The mean load across the network is 147.22, while the variance 1304.71. The highest load is 167, on several links. Thus traffic is evenly distributed over the network, but the overall network load is relatively high.

In the quadratic optimization algorithm embodiment, traffic for each demand is allocated to one or more paths between the first and second nodes based on weights for each path. Following the method above, the traffic for demand 1 is allocated with a 0.06272 weight for the path N1-N2-N4-N7, and a 0.93728 weight for the path N1-N3-N5-N7.

The traffic for demand 2 is allocated with a 0.22270 weight for the path N2-N1-N3-N6-N 8-N9; a 0.25836 weight for the path N2-N4-N7-N9; a 0.03627 weight for the path N2-N 5-N7-N9; and a 0.48267 weight for the path N2-N5-N8-N9. The traffic for demand 3 is allocated with a 0.61105 weight for the path N2-N4-N7; and a 0.38895 weight for the path N2-N5-N7. The mean load across the network is 115.76, while the variance 3290.10. The highest load is 182, on the N2-N5 link. Thus traffic is less evenly distributed over the network than the minimax embodiment, but the overall network load is lower. Compared to the shortest path method, the overall network load is higher, but much more evenly distributed over the network.

Embodiments of the present disclosure thus provide apparatus, computer program products and methods for allocating traffic in a telecommunications network.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element. Further embodiments likewise, with the benefit of this disclosure, will be apparent to those having ordinary skill in the art, and such embodiments should be deemed as being encompassed herein.

The invention claimed is:

1. A method for allocating traffic in a telecommunications network, the telecommunications network comprising a plurality of nodes, with pairs of nodes being connected by respective links, the method comprising:
obtaining a plurality of demands for connectivity between respective first nodes and respective second nodes of the telecommunications network, each demand being subject to a respective constraint associated with the connectivity between the respective first node and the respective second node;
for each demand:
generating a list of possible paths between the first node and the second node satisfying the constraint; and
determining weights in respect of each of the possible paths based on the list of possible paths for each demand and an indication of traffic usage for each demand; and
providing the weights to nodes of the telecommunications network, for the distribution of traffic associated with each of the plurality of demands to the possible paths in accordance with the respective weights.

2. The method of claim 1, wherein the determining weights comprises performing a global optimization algorithm, having as input the lists of possible paths for the plurality of demands and the indications of traffic usage for the plurality of demands, to generate the weights.

3. The method of claim 2, wherein each link has a capacity, and wherein the optimization algorithm seeks to minimize the globally highest ratio of traffic usage to capacity for a link.

4. The method of claim 2, wherein each link has a capacity, and wherein the optimization algorithm seeks to minimize a sum of the square of the ratio of traffic usage to capacity for the plurality of links.

5. The method of claim 2, wherein the optimization algorithm comprises a quadratic optimization algorithm or a minimax linear algorithm.

6. The method of claim 1, wherein the respective constraint for each demand comprises: a maximum latency; a maximum light path length before optical-to-electrical conversion; a maximum number of electro-optic converters per unit path length; a maximum number of nodes; and/or a maximum number of segments used to express path routing.

7. The method of claim 6, wherein each link is associated with a latency, and wherein the generating the list of possible paths comprises determining all paths through the telecommunications network from the first node to the second node having a cumulative latency which is less than the maximum latency.

8. The method of claim 1, wherein the generating the list of possible paths comprises performing a breadth-first search or a depth-first search.

9. The method of claim 1, wherein each of the demands for connectivity is associated with an expected amount of traffic.

10. The method of claim 1, wherein the telecommunications network comprises a fronthaul network providing connectivity between nodes of a radio access network.

11. The method of claim 1, wherein the method is performed in a software-defined networking controller for the telecommunications network.

12. A network management node for allocating traffic in a telecommunications network; the telecommunications network comprising a plurality of nodes, with pairs of nodes being connected by respective links; the network management node comprising:
processing circuitry;
memory containing instructions executable by the processing circuitry whereby the network management node is operative to:
obtain a plurality of demands for connectivity between respective first nodes and respective second nodes of the telecommunications network, each demand being subject to a respective constraint associated with the connectivity between the respective first node and the respective second node;
for each demand:
generate a list of possible paths between the first node and the second node satisfying the constraint; and determine weights in respect of each of the possible paths based on the list of possible paths for each demand and an indication of traffic usage for each demand; and provide the weights to nodes of the telecommunications network, for the distribution of traffic associated with each of the plurality of demands to the possible paths in accordance with the respective weights.

13. The network management node of claim 12, wherein the instructions are such that the network management node is operative to determine the weights by performing a global optimization algorithm, having as input the lists of possible paths for the plurality of demands and the indications of traffic usage for the plurality of demands, to generate the weights.

14. The network management node of claim 13, wherein each link has a capacity, and wherein the optimization algorithm seeks to minimize the globally highest ratio of traffic usage to capacity for a link.

15. The network management node of claim 13, wherein each link has a capacity, and wherein the optimization algorithm seeks to minimize a sum of the square of the ratio of traffic usage to capacity for the plurality of links.

16. The network management node of claim 13, wherein the optimization algorithm comprises a quadratic optimization algorithm or a minimax linear algorithm.

17. The network management node of claim 12, wherein the respective constraint for each demand comprises: a maximum latency; a maximum light path length before optical-to-electrical conversion; a maximum number of electro-optic converters per unit path length; a maximum number of nodes; and/or a maximum number of segments used to express path routing.

18. The network management node of claim 17, wherein each link is associated with a latency, and wherein the generating the list of possible paths comprises determining all paths through the telecommunications network from the first node to the second node having a cumulative latency which is less than the maximum latency.

19. The network management node of claim 12, wherein the network management node is caused to generate a list of possible paths by performing a breadth-first search or a depth-first search.

20. The network management node of claim 12, wherein each of the demands for connectivity is associated with an expected amount of traffic.

21. The network management node of claim 12, wherein each of the demands for connectivity is associated with a measured amount of traffic.

* * * * *